United States Patent Office

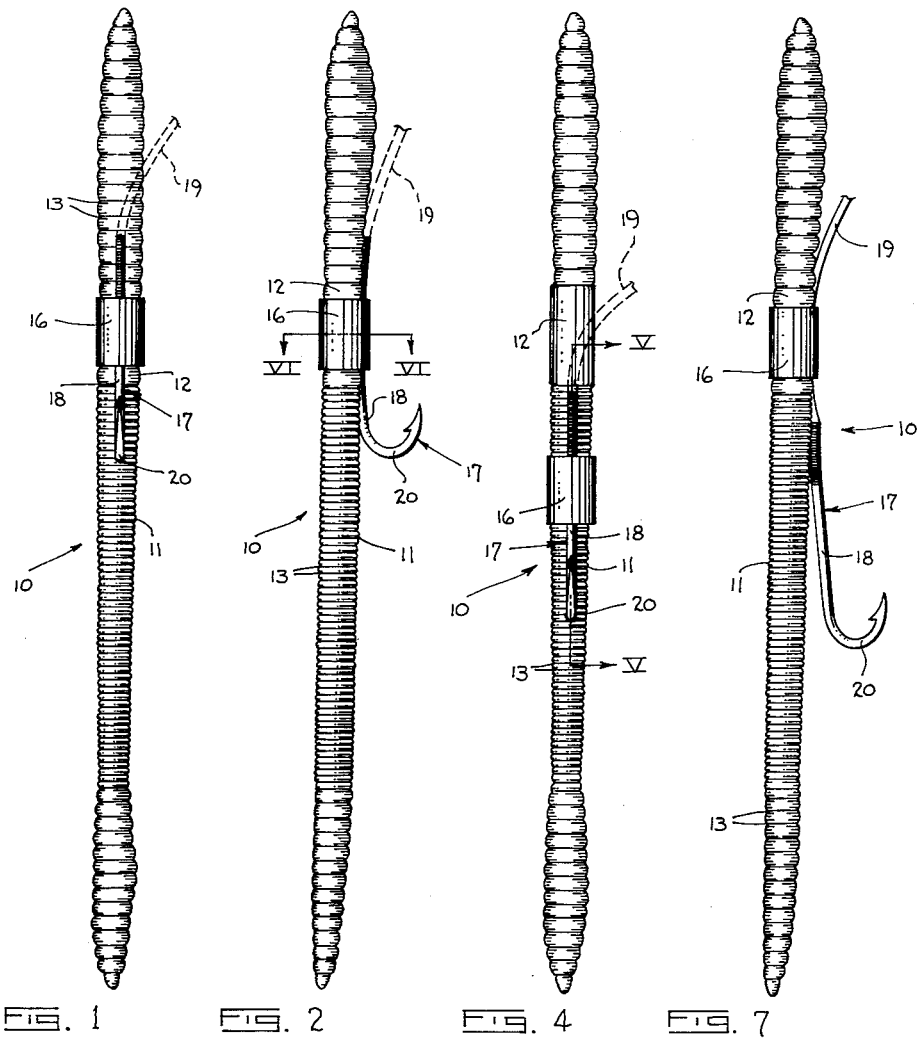
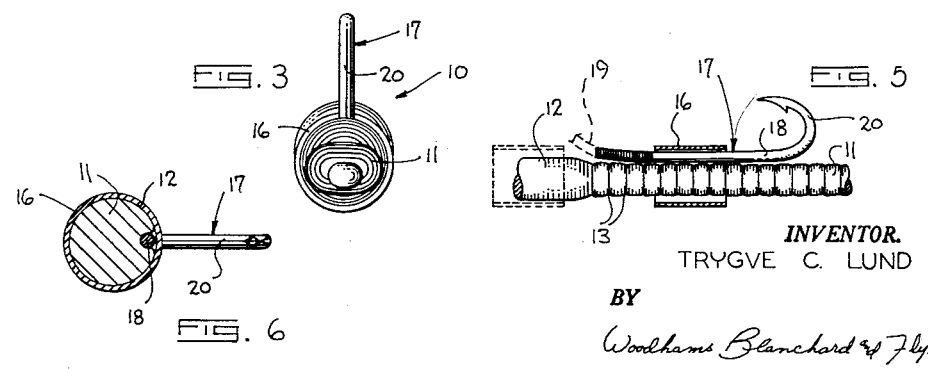

2,979,850
Patented Apr. 18, 1961

---

2,979,850

ARTIFICIAL FISH LURE

Trygve C. Lund, Dowagiac, Mich., assignor to James Heddon's Sons, Dowagiac, Mich., a corporation of Michigan Filed Jan. 4, 1960, Ser. No. 414

1 Claim. (Cl. 43—42.24)

This invention relates in general to an artificial fish lure having an elongated body girdled by a light-reflecting, fish-attracting band which also serves to removably and firmly hold a hook with respect to the body.

Experienced fishermen are acquainted with the fact that there are certain conditions under which the ordinary night crawler provides the most effective fish bait. Such conditions may arise out of the time of the year, the general weather conditions, or the type of fish in the area. Moreover, even an experienced fisherman must sometimes experiment with his bait before he finds the one which is best for the particular occasion. It is not always convenient for a fisherman to carry a can full of live night crawlers with him and, therefore, attempts have been made to provide artificial night crawlers which can be carried in a bait box and used when the need arises. However, existing artificial baits having the appearance of a night crawler have not been entirely satisfactory for several reasons. In the first place, existing artificial night crawlers cannot be easily connected to a line without using some form of complicated harness or without damaging the artificial night crawler by piercing it with a hook. Furthermore, even the best artificial night crawler not only tends to look somewhat unnatural, but also lacks a means of attracting the attention of the fish to the bait. As a result, artificial night crawlers are not widely used by fishermen if it is reasonably possible to obtain live night crawlers.

It is also recognized by experienced fishermen that fish, and particularly game fish of the type which will strike at night crawlers, usually feed for relatively short periods of time. Accordingly, it is to the fisherman's advantage to keep the fish bait in the water as much as possible during the feeding period. However, where live night crawlers are used, a good share of the feeding period is often used to replace the bait upon a hook from which a previous bait has been removed by a fish. Moreover, it often happens that the bait is removed from the hook without the knowledge of the fisherman so that the baitless hook sometimes remains in the water during a substantial part of the feeding period.

Accordingly, a primary object of this invention has been the provision of an artificial fish lure having the general appearance and visible characteristics of a night crawler, but having the resistance and durability of an artificial bait which can be struck and/or taken by fish repeatedly without damaging the bait.

A further object of this invention has been the provision of an artificial fish lure, as aforesaid, having reflective means for attracting the attention of fish without detracting from its intended appearance as an artificial bait, said reflective means also serving to connect the body of the artificial lure to a hook and/or a fish line connected to a hook, without necessitating a piercing of the lure body by the hook.

A further object of this invention has been the provision of an artificial fish lure, as aforesaid, which is relatively inexpensive to produce, which is extremely easy to mount upon a fish line, which can be conveniently carried in a bait box, which is durable and which requires no special attaching mechanism so that it can be connected to a conventional hook upon a moment's notice.

Other objects and purposes of this invention will become apparent to persons familiar with this type of equipment upon examining the accompanying drawings in which:

Figure 1 is a top plan view of an artificial fish lure embodying the invention.

Figure 2 is a side elevational view of said artificial fish lure.

Figure 3 is a rear end elevational view of said artificial fish lure.

Figure 4 is a top plan view of said artificial fish lure in a partially assembled condition.

Figure 5 is a sectional view taken along the line V—V in Figure 4.

Figure 6 is a sectional view taken along the line VI—VI in Figure 2.

Figure 7 is a side elevational view of said fish lure in a different position of operation.

For convenience in description, the terms "upper," "lower" and derivatives thereof will have reference to the fish lure as appearing in Figures 3 and 5. The terms "front," "rear" and derivatives thereof will have reference to the upper and lower ends respectively of the fish lure as appearing in Figures 1 and 2. The terms "inner," "outer" and derivatives thereof will have reference to the geometric center of said fish lure and parts thereof.

*General description*

The objects and purposes of the invention, including those set forth above, have been met by providing an artificial fish lure comprised of a resiliently flexible, elongated body member having the appearance characteristics of a night crawler which is snugly embraced between its ends by a relatively rigid sleeve having a light-reflective external surface. The body member has a portion of enlarged diameter which is spaced from both ends and has an average normal outside diameter somewhat larger than the inside diameter of the sleeve. The sleeve is positioned upon the enlarged portion by stretching the body member until the cross-sectional dimensions of said enlarged portion are less than the inside diameter of the sleeve.

The sleeve serves not only to attract fish but also, when desired, to hold a hook in snug engagement with the body member.

*Detailed description*

The artificial fish lure 10 (Figures 1 and 2), which has been selected to illustrate a preferred embodiment of the invention, is comprised of an elongated resiliently flexible body member 11 which has an appearance substantially similar to that of a night crawler. The body member is preferably, but not necessarily, molded from highly plasticized polyvinyl chloride having a soft, spongy and resilient quality which is well suited to the intended use. Other plastic materials or the like having similar characteristics may be equally applicable. The body member, which is gently and gradually tapered from a point near the front end to the rear end, has an enlarged portion 12 near to, but spaced from, the front end thereof. A plurality of spaced, annular grooves encircle said body member at substantially uniform intervals along said body member from said enlarged portion to both ends of the body member. Said enlarged portion 12 is substantially circular in cross section and has an average normal diameter preferably larger than the average diameter of said body member at any point between said enlarged portion and the rearward end of the body member.

The body member 11 (Figures 2 and 6) is encircled by a sleeve 16 which preferably has a substantially rigid and cylindrical shape. The inside diameter of the sleeve 16 is less than the average outside diameter of the enlarged portion 12, but is preferably large enough to permit at least a portion of the rearward end of the body member 11 to slide through said sleeve even when said rearward end is in an undistorted condition.

The sleeve 16 (Figures 5 and 6), which is preferably fabricated from metal and has a relatively small wall thickness, has a reflective external surface which may be the natural, polished finish of the metal or which may be painted or otherwise applied thereto. Said sleeve 16 has a lengthwise, axial extent which is preferably less than the length of the enlarged portion 12. Accordingly, when the sleeve 16 embraces the central part of the enlarged portion 12, the opposite ends of said enlarged portion 12 extend axially beyond the sleeve 16 and, due to their resilience, project radially outwardly of the inside diameter of said sleeve to resist accidental dislocation of said sleeve from said enlarged portion 12.

A fishhook 17 (Figures 2 and 5) may have its shank 18 extending through the sleeve 16 whereby said shank is held snugly and firmly adjacent to said body member and against lengthwise movement with respect thereto. The hook 17 may be of any convenient conventional type connected or connectible to either a snell or a line indicated at 19.

Operation

In one form of the fish lure 10, the body member 11, sleeve 16 and hook 17 are three separate and separable parts which are easily and quickly assembled by first inserting the hook 17 through the sleeve 16 so that the shank 18 is encircled thereby. The rearward end of the body member 11 is then inserted into the sleeve 16, as far as it will move by sliding, alongside of the shank 18. The opposite end portions of the body member 11 are then grasped and pulled away from each other, whereby the body member 11 is stretched and its cross-sectional dimension is reduced, so that the diameter of the enlarged portion 12 is smaller than the inside diameter of the sleeve 16, less the diameter of the hook 17. The sleeve 16 and hook 17 are then moved onto the center of the enlarged portion 12, after which the two ends of the body member 11 are released. The resiliently flexible composition of the body member 11 causes it to return to its initial shape whereby the outer surface of the enlarged portion 12 and the shank 18 of the hook 17 are pressed firmly against the inner surface of the sleeve 16.

Under normal fishing conditions, the outward force created by the resistance of the body member to such compression is sufficient to hold both the sleeve 16 and hook 17 in the desired position when the lure 10 is suspended in the water by the line 19. Moreover, the hook 17 will be closely adjacent to the light-reflective sleeve 16, which materially enhances the attractiveness of the body member 11 as a fish lure and will encourage the fish to strike at the bait near the hook. If a fish (or snag if the bait is being pulled through the water) engages the body member 11 and thereby moves it with respect to the shank 18 and/or the sleeve 16, the curved portion 20 of the hook 17 will engage the sleeve 16 and thereby positively limit such movement. Because the axial ends of the enlarged portion 12 project radially outwardly in front of the opposite ends of the sleeve 16, they resist axial movement of the sleeve 16 with respect to the body member 11.

Under some circumstances, and particularly where it may be important to have the curved portion 20 of the hook 17 located in a particular position with respect to the body member 11, it may be desirable to secure the shank 18, as by welding, to the sleeve 16. In such case it would be advantageous to have the hook 17 provided with a permanently attached snell or leader. It follows that the hook 17 can be held in a variety of positions with respect to the sleeve 16 and, further, that more than one hook can be thusly held.

It will also be seen that, if the conditions justify, the hook 17 may be pulled completely through the sleeve 16 so that the line 19 (Figure 7) is held against the body member 11 by the sleeve 16. In this case, and in order to prevent uncontrolled movement of the hook 17 with respect to the body member 11, it may be desirable either to wind the leader 19 around the sleeve or to pierce with the hook 17 a small portion of the body member 11, and thereby hold the hook in the desired position. Moreover, the sharpened tip of the hook 17 may be buried in the body member 11 to give the fish lure a weedless characteristic.

Although a particular preferred embodiment of the invention has been disclosed in detail above for illustrative purposes, it will be understood that variations or modifications of such disclosure, which come within the scope of the appended claim, are fully contemplated.

What is claimed is:

An artificial fish lure, comprising:

an elongated, flexible, compressible, longitudinally stretchable, resilient body member having substantially the shape of a worm, said body member being tapered from a point near one end thereof to a point near the other end thereof and having a portion of enlarged, substantially circular cross section located between said points and spaced from both ends of said body member, said enlarged portion having a smooth periphery and the remainder of the body member having closely spaced, annular ribs extending therearound;

a thin-walled cylindrical sleeve encircling and located between the ends of said enlarged portion of said body member, said sleeve having a light-reflective external surface, the axial length of said sleeve being slightly less than the axial length of said enlarged portion, the internal diameter of said sleeve being greater than the diameter of the tapered portion so that the sleeve is freely slidable axially with respect to said body member along said tapered portion up to said enlarged portion, the internal diameter of said sleeve being less than the diameter of said enlarged portion when same is not compressed, said sleeve holding said enlarged portion under compression and said enlarged portion having radially outwardly extending bulges at the ends thereof which engage the respective axial ends of said sleeve and hold the sleeve against axial movement with respect to said body member whereby said sleeve may be mounted on or removed from said body member by longitudinally stretching said body member; and a hook mounted on said body member.

References Cited in the file of this patent

UNITED STATES PATENTS

| | | |
|---|---|---|
| 2,563,825 | Ebert | Aug. 14, 1951 |
| 2,572,608 | Gabor | Oct. 23, 1951 |
| 2,573,018 | Herrick | Oct. 30, 1951 |
| 2,686,381 | Peterson | Aug. 17, 1954 |
| 2,792,662 | Norton | May 21, 1957 |